July 31, 1962     K. R. BROWN     3,047,750
TORQUE MOTORS HAVING A RESTRICTED RANGE OF ANGULAR MOVEMENT
Filed March 9, 1959
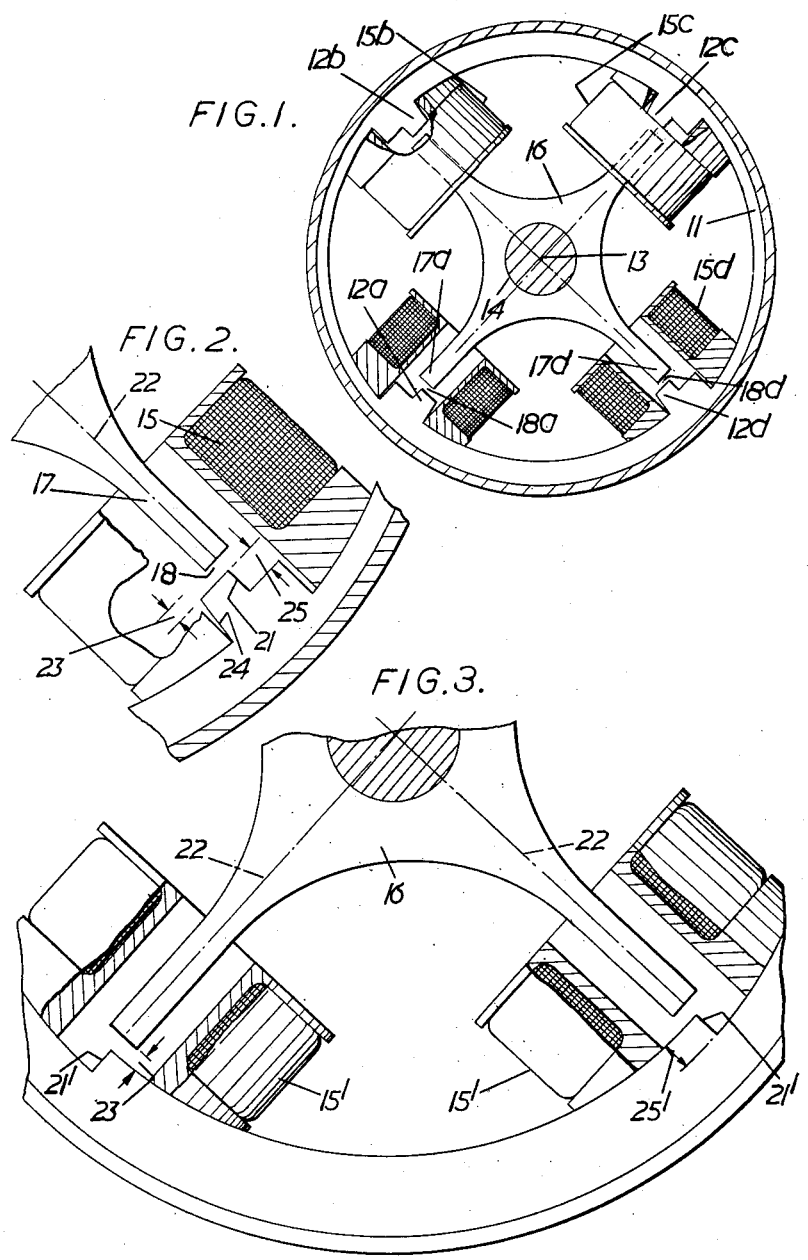
Inventor
Kenneth Robson Brown
By
Cameron, Kerkam & Sutton
Attorneys

United States Patent Office 3,047,750
Patented July 31, 1962

3,047,750
TORQUE MOTORS HAVING A RESTRICTED RANGE OF ANGULAR MOVEMENT
Kenneth Robson Brown, Wilkieston, Kirknewton, Scotland, assignor to Ferranti, Limited, Hollinwood, England, a company of United Kingdom of Great Britain and Northern Ireland
Filed Mar. 9, 1959, Ser. No. 798,091
Claims priority, application Great Britain Mar. 13, 1958
5 Claims. (Cl. 310—38)

This invention relates to torque motors for servo control systems and the like and specifically to torque motors for a restricted range of angular movement.

An object of the invention is to provide such a torque motor which is capable of producing a substantially maximum torque for given overall dimensions of the motor, a given value of the energising power, and a given radial length of airgap between rotor and stator poles.

Another object is to provide such a motor which over the restricted range of movement provides a torque which is linearly proportional to a control signal.

In accordance with the present invention a torque motor for a restricted range of angular movement includes a plurality of salient stator poles, a rotor having a like plurality of poles for co-operation with the stator poles, each to each, the end portion at least of each rotor pole being elongated in the radial direction, and for each rotor pole and its co-operating stator pole a winding fixed with respect to the stator pole and extending over said end portion of the rotor pole, the inner dimensions of the winding being such as to allow the angular movement of the rotor over said range, the respective lengths in the radial direction of each rotor pole and the co-operating stator pole being such as to provide the maximum torque for a given radial length of the airgap between them, a given value of the energising power, and given over all dimensions of the motor.

Each winding may also extend over the tip of the co-operating stator pole.

The terms "radial," "diametrical," etc., as used throughout this specification, should be understood as meaning with reference to the rotor axis.

In the accompanying drawings,

FIGURE 1 shows a section through a torque motor in accordance with one embodiment of the invention, FIGURE 2 shows a part of FIGURE 1 to an enlarged scale, and FIGURE 3 shows a section through a part of a torque motor in accordance with another embodiment.

In carrying out the invention in accordance with one form by way of example, see FIG. 1, a torque motor the overall diameter of the stator yoke of which is restricted to two inches, includes the yoke itself 11, of the usual cylindrical form, from the inner curved surface of which four salient stator poles 12a to 12d extend inwards in the radial direction with respect to the axis 13 of the shaft 14 which carries the rotor. The pair of poles 12a and 12c are diametrically opposite one another; the other pair of poles 12b and 12d are also diametrically opposite one another. The four poles are spaced around axis 13 with a slight departure from exact uniformity which will be indicated below.

Fixed with respect to each stator pole is a winding 15a, 15b, etc., as the case may be, the axis of which extends radially.

Secured to shaft 14 is an unwound rotor 16 having four poles 17a to 17d uniformly spaced round the shaft for co-operation with the four stator poles 12a to 12d, each to each. Each rotor pole is elongated in the radial direction and extends towards the co-operating stator pole sufficiently to leave an airgap 18a, 18b, etc., as the case may be—see also FIG. 2—between them. The tip of each stator pole and of each rotor pole has an angular span of about seven degrees in planes normal to axis 13. The radial length of each airgap, which is exaggerated in the drawing, is determined by such design considerations as the required rapidity and linearity of the response of the motor.

Each stator and rotor pole winding 15 extends towards axis 13 over the tip of the stator pole and beyond it over the elongated end portion of the rotor pole sufficiently for the airgap 18 between the poles to be located between the axial centre of the winding and the end of the winding remote from axis 13. A more exact indication of the position of the airgap will be given later. Each rotor pole thus extends part way into the winding. The inner dimensions of that part of the winding which surrounds the rotor pole is of course made large enough to permit some angular movement of the rotor. Such a movement is necessarily restricted by the winding but the range of angular movement of the motor is only required to be of the order of two or three degrees and the winding may easily be designed to allow this.

Each pair of diametrically opposite windings 12a and 12c, and 12b and 12d, is arranged to be energised in series by a current—$i_1$ or $i_2$, say, as the case may be—individual to that pair, the two currents being applied in directions for setting up opposing torques. Whilst the sum of these currents is maintained constant, the difference between them is maintained proportional to the signal which is intended to control the motor. This may be effected, for example, by means of a valve stage of the kind disclosed in the present applicant's British patent specification No. 692,203. It is necessary that when the control signal, and hence the current difference, is zero the rotor torque should be zero, the rotor then lying in a null angular position, as depicted in the drawings, where the reluctances of all four airgaps are equal.

It is further necessary that at the least departure of the signal from zero the rotor should develop a torque of appropriate sense and proportionate extent. These requirements are satisfied by displacing the stator poles from the positions of exact uniform spacing round the rotor axis.

In the arrangement depicted in FIG. 1, stator pole 12a is displaced towards the adjacent pole 12d to the extent of half the angular span of the pole in planes normal to the rotor axis. The other two stator poles are displaced towards one another to the same extent. In each case, therefore, one edge 21 (see FIG. 2) of a stator pole is in alignment with the centre line 22 of the co-operating rotor pole when the rotor is in the null position. These displaced positions of the stator poles are still consistent with poles 12a and 12b being exactly diametrically opposite poles 12c and 12d respectively. Owing to the smallness of these displacements the stator poles may nevertheless be considered as spaced approximately uniformly round the rotor axis.

The rotor poles 17, on the other hand, are spaced exactly uniformly—that is, are spaced at 90 degree intervals—as already stated. Alternatively, the stator poles may be spaced uniformly and the rotor poles displaced from exact uniformity to the indicated extent.

In operation, it is clear that the tangential force developed at each rotor pole is proportional to the square of the field strength in the airgap between it and the co-operating stator pole and hence is proportional to the square of the current which energises the winding common to both. The resultant torque is thus also proportional to $(i_1^2 - i_2^2)$, assuming that $i_1$ is the greater. This expression can be written $(i_1 + i_2)(i_1 - i_2)$. As $(i_1 + i_2)$ is kept constant, the resultant torque is proportional to $(i_1 - i_2)$ and hence is portional to the control signal, as is required.

The torque developed at each pole 17 of the rotor is dependent on the strength of the field and on the radial length of that pole. This length is of course a maximum when the radial length of the co-operating stator pole 12 is a minimum, the airgap 18 between them then lying close to the axial end of the winding remote from the rotor axis, as shown in FIG. 2. As the field strength varies but slightly along the axis of the winding, the maximum torque is attained by making the radial lengths of the rotor poles as long as possible consistent with the need to allow for airgaps of the designed radial length 23 and the need to provide a stator pole which is radially long enough as regards the edge 21 (the other edge 24 being ineffective) to act effectively as a salient pole. The length of stator pole which results in the maximum torque is best determined experimentally. In the present example, where the yoke has an overall diameter of two inches, a stator pole having an effective edge 21 the length 25 of which in the radial direction is one-tenth of an inch (which is one twentieth of the yoke diameter) is found in practice to result in a maximum torque for a given length of airgap and a given value of the energising power. With an airgap of typical design, the length 25 of the stator pole is approximately ten times the length 23 of the airgap.

Various modifications within the scope of the invention may be made to the above-described embodiment. For example, as only the edge 21 of each stator pole is effective the arrangement of FIG. 1 may be modified as shown in FIG. 3. Here each stator pole takes the form of a salient step the edge $21^1$ of which corresponds to the effective edge 21 of a stator pole of FIGS. 1 and 2 and is therefore in alignment with the centre line 22 of the co-operating rotor pole when in the null position. Each winding $15^1$, whilst being again fixed with respect to the associated stator pole—this time a step $21^1$—now extends over the rotor pole only, and not, as before, over the tip of the stator pole as well. The inner dimensions of the windings are again such as to allow angular movement of the rotor over the range required. The factors which determine the length $25^1$ of each stator pole for a given length 23 of airgap and the general operation of this embodiment remain the same as before.

A torque motor in accordance with the invention thus provides a torque which for given values of overall dimensions, energising power, and length of airgaps is substantially a maximum, and which is accurately proportional to the control signal.

What I claim is:

1. A torque motor for a restricted range of angular movement including a stator having a plurality of salient stator poles extending radially inwardly toward the axis of the motor, an unwound rotor having a like plurality of poles for co-operation with the stator poles, each to each, the end portion at least of each rotor pole being elongated in the radial direction toward the co-operating stator pole, and for each rotor pole and its co-operating stator pole a winding fixed with respect to the stator pole and extending over said end portion of the rotor pole in surrounding relationship thereto, the inner dimensions of the winding being such as to allow the angular movement of the rotor pole over said range within said winding, the respective lengths in the radial direction of each rotor pole and the co-operating stator pole being such as to provide an airgap between them lying closely adjacent to that end of the associated winding which is remote from the rotor axis, and to provide the maximum torque for a given radial length of said airgap, a given value of the energising power, and given overall dimensions of the motor.

2. A motor as claimed in claim 1 wherein each winding extends also over the tip of the co-operating stator pole.

3. A motor as claimed in claim 1 wherein each winding extends over the associated rotor pole only, the respective lengths in the radial direction of each rotor pole and the co-operating stator pole being such that the airgap between them lies outside the associated winding.

4. A motor as claimed in claim 1 wherein the length in the radial direction of each stator pole is approximately ten times the length in that direction of the airgap between it and the co-operating rotor pole.

5. A motor as claimed in claim 1 wherein the stator includes a cylindrical yoke from which the stator poles extend radially inwardly and the length in the radial direction of each stator pole is approximately one twentieth of the outside diameter of the stator yoke.

References Cited in the file of this patent

UNITED STATES PATENTS 1,725,203     McNerney              Aug. 20, 1929

FOREIGN PATENTS 918,823     Germany               Oct. 7, 1954